SCAN MAGNITUDE CONTROL FOR CATHODE-RAY TUBES

Filed Feb. 10, 1949 2 Sheets-Sheet 1

INVENTOR
BARNET S. TROTT.
BY Hoag, Killam and Carlson
ATTORNEYS

INVENTOR
BARNET S. TROTT.
BY Hoag, Kilbourne and Carlin
ATTORNEYS

Patented June 6, 1950

2,510,670

UNITED STATES PATENT OFFICE 2,510,670

SCAN MAGNITUDE CONTROL FOR CATHODE-RAY TUBES

Barnet S. Trott, Kew Gardens, N. Y., assignor to Garod Radio Corporation, Brooklyn, N. Y., a corporation of New York Application February 10, 1949, Serial No. 75,714

4 Claims. (Cl. 178—7.5)

This invention relates to video receiver means and apparatus for presenting pictorial intelligence, including means and apparatus therein for predeterminedly controlling the size and shape of the picture shown thereon and is a continuation in part of copending application S. N. 64,668, filed December 10, 1948, in the name of Barnet S. Trott.

More particularly it relates to means and apparatus enabling the user of a television receiver to alter the size of the picture received on the television screen without distorting it or in any other way interfering with its proper reception.

The screen of the usual cathode ray tube employed in present day television receivers is of circular shape but for standardization purposes and convenience in scanning, the electron beam reproducing the picture thereupon is swung back and forth in paths that are substantially parallel to each other and substantially horizontal as viewed. The circuits of commercial receivers are so designed that horizontal and vertical limits of travel of the electron beam form a rectangular picture having a base larger than its altitude. It is obvious that since this rectangle is inscribed within the circular screen its area must be appreciably less than that of the screen itself, thus a large portion of the useful area of the screen is lost. For example, in television receivers currently available commercially using a cathode ray tube of 10 inches diameter about 65 square inches represent useful screen surface, but the rectangular picture developed on such a screen is in the neighborhood of only 48 square inches.

It is obvious that if the dimensions of the rectangular picture were enlarged so that the entire useful surface of the screen were used, a portion of the picture would not be reproduced because it would extend beyond the limits of the screen. To express it in other words, the circular screen would now be enclosed in the rectangle of the picture.

It is obvious that one of these arrangements has distinct advantages under one set of conditions and distinct disadvantages under other sets of conditions. Should the user desire to view a scene with a large field of action, he desires to reproduce the entire received picture on the screen, in which case the arrangement of having the picture rectangle inscribed in the screen circle even at the loss of some available screen space is desirable. If, however, the user desires to view only a portion of the picture and wants to get as large an image as is practically possible for the screen used, it would be more advantageous to have the picture rectangle of sufficient size so that the entire useable surface of the screen is used to reproduce that portion of the picture he chooses to view.

In usual commercial practice control circuits are provided in a television receiver which determine the size and shape of the picture rectangle and are either factory adjusted or more or less permanently adjusted at the time of installation. Up to the present time there has been no arrangement of circuits permitting alteration of the size of the picture by the user and the reason for this is that if one of the circuits controlling one dimension, say the length, of the picture is changed and the circuit controlling the other dimension, say the height, is not changed in proper relation to the change effected in the first circuit, the relation of length to height, commonly known as the aspect ratio, will be changed and the picture will be distorted.

It is therefore an object of the present invention to provide circuits in association with a television receiver controlling the size of the reproduced picture and means for regulating them which can be conveniently operated by an unskilled user either at the receiver or relatively remote therefrom to effect said change in picture size without distortion or other undesirable effects.

It is another object of the invention to provide means in association with a television receiver whereby an unskilled user can automatically and simultaneously vary the two dimensions of the picture reproduced in such proportion that the aspect ratio of the picture remains unchanged.

It is a further object of the invention to provide means relatively remote from but associated with a television receiver whereby the circuits therein determining the size of the picture reproduced may be automatically regulated to produce pictures of different size but of unchanged aspect ratio.

Further and additional objects, features and advantages will in part be obvious or in part pointed out in the following description and accompanying drawings.

The invention consists in the features of construction, combination of elements, and arrangement of parts as will be exemplified in the preferred embodiment hereinafter described and the scope of the invention will be indicated in the appended claims.

In the accompanying drawings in which similar reference characters relate to similar parts and which form a part of this specification:

Figure 1:
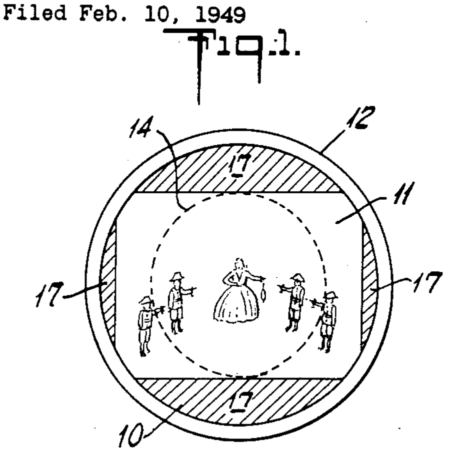
Fig. 1 is a plan view of a screen of a television receiver with a rectangular picture shown thereon in which the entire received picture is visible.

Referring to Fig. 1, 10 represents the useful portion of the viewing screen of a conventional cathode ray receiving tube upon which is shown the representation of a received picture 11. Picture 11 is of rectangular shape and is entirely inscribed in circular portion 10 which is framed by a masking border or frame 12 which serves the dual function of masking out the unuseful edge portion of the screen and serving as a pleasing frame to accentuate the picture. Frame 12 may be of any suitable material and there may be placed over the entire assembly a pane of glass 13 (see Fig. 3) or other suitable transparent material for the purpose of safety and to provide some light diffusion to soften the picture being shown.

The scene shown on Fig. 1 represents one in which there is a relatively large field of action, such as an operatic choral number in which a relatively large number of incidental characters as well as a main or central character is shown. It is to be noted that an area including the central character is encircled in Fig. 1 by a broken line forming a circular area 14 in the picture.

Figure 2:
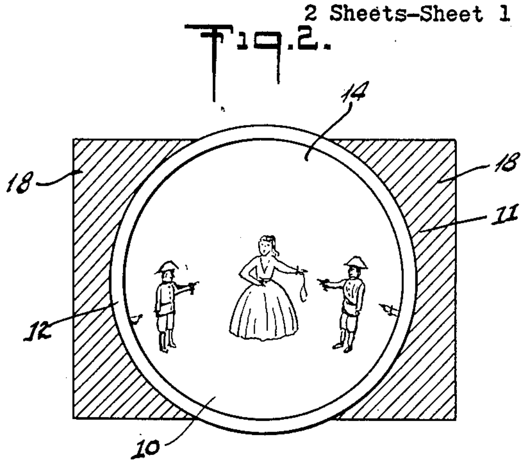
Fig. 2 is a plan view of a screen of the same dimensions with a picture shown thereon which is only part of that shown in the screen of Fig. 1 but which is of greatly enlarged proportions.

If for better viewing interest, the user of a receiver embodying the present invention desires to concentrate on the main or central character, as when the main or central character is giving a solo and the other characters are immobile, he merely operates a switch 15 (see Fig. 3) which may be connected to the receiver by a suitable insulated electric cable 16 of any reasonable length so that the user need not stir from his relatively remote viewing position and thereby accomplish the result shown in Fig. 2. In Fig. 2 the rectangle picture outline 11 is shown of much greater dimensions than it was in Fig. 1 but of the same shape, that is, having the same aspect ratio. The result is that the picture information contained within area 14 of the original picture now fills the entire useful area 10 of the screen and that the details within area 14 are greatly enlarged, giving the effect of what is known in the art as a "close-up."

It is to be noted that in Fig. 1 the shaded portions 17 of useful screen area 10 are lost in the reproduction of the picture and that in Fig. 2 the shaded portions 18 represent portions of the received picture which are lost in the reproduced picture because they are outside of the useful area 10 of the screen. As pointed out above, there are times when either one of these situations are extremely disadvantageous and a compromise must be made between them in the ordinary receiver. However, in a receiver embodying the present invention where the unskilled user can readily shift from one to the other, full advantage of each may be retained when the conditions warrant it.

Figures 3, 5, 6:
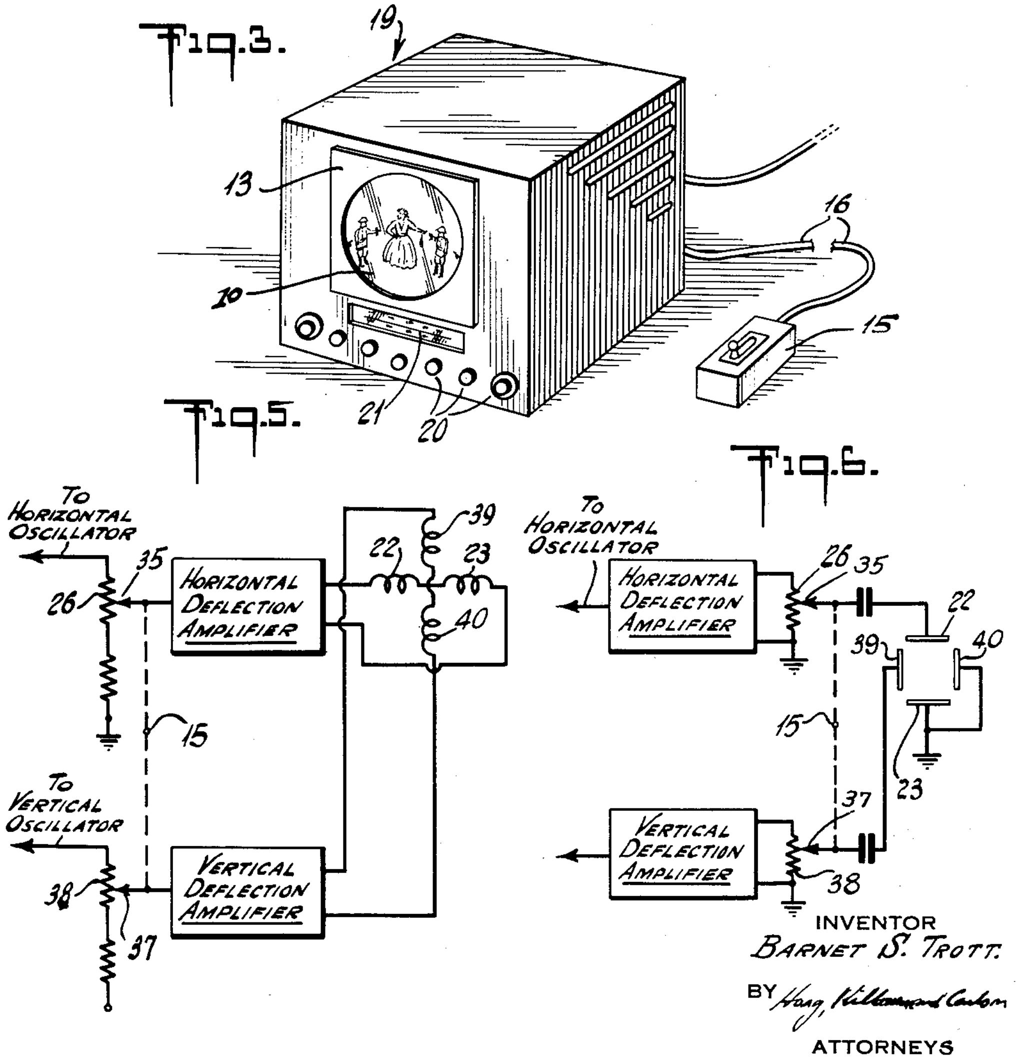
Fig. 3 is a pictorial representation of a television receiver embodying a user's control in accordance with the present invention.
Fig. 5 is a combined block and circuit diagram of a portion of a television receiver embodying another modification of the present invention.
Fig. 6 is a combined block and circuit diagram of a television receiver embodying another modification of the present invention adapted to an electrostatically controlled tube.

In Fig. 3 there is shown an otherwise conventional television receiver to which my invention has been applied. This receiver has the conventional cabinet 19 with a viewing aperture covered by pane 13 through which screen 10 framed by ring 12 may be seen. It has the usual tuning, volume, intensity and stabilization controls shown generally at 20 and a tuning or channel indicator 21. Attached to the receiver by cable 16 is picture size control switch, the functioning of which is described in more detail hereinbelow in connection with the block and circuit diagrams.

Figure 4:
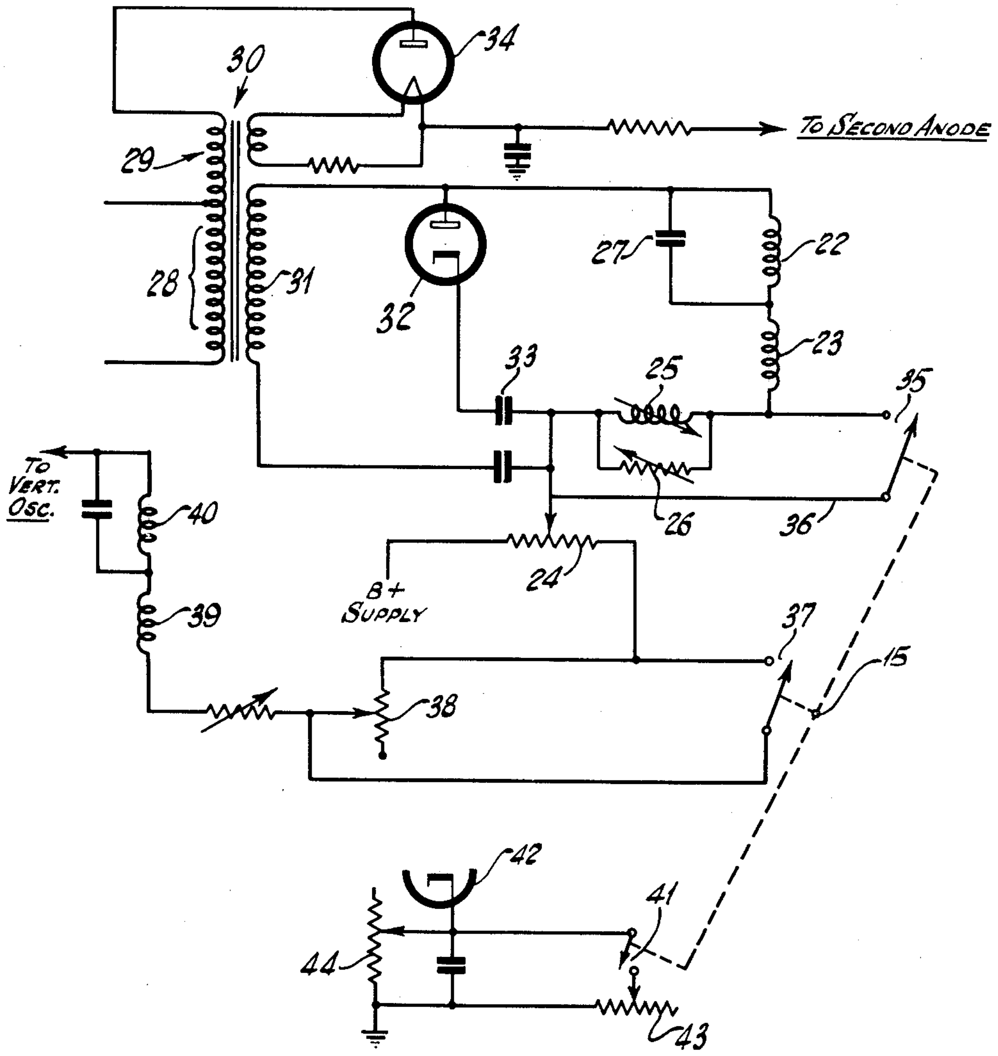
Fig. 4 is a circuit diagram of a portion of a television receiver showing circuits and means for controlling the circuits which determine the dimensions of the reproduced picture.

In Fig. 4 the direct current component of the horizontal deflection voltage is fed to horizontal deflection coils 22 and 23 from the positive side, B, of a voltage source through a potentiometer 24 and an impedance network consisting of inductance 25 and resistance 26, either or both of which may be adjustable. Across one of the deflection coils 22 a balancing condenser 27 is connected in shunt. The alternating current component of the horizotal deflection voltage is supplied to horizontal deflection coils 22 and 23 by feeding the output of a conventional saw-tooth oscillator (not shown) across a portion 28 of the primary 29 of a transformer 30, the secondary 31 of which is across the input of damping tube 32. The output of tube 32 is coupled through condenser 33 to horizontal deflection coils 22 and 23. The second anode potential is obtained in the conventional manner by rectifying the voltage across the entire primary 29 of transformer 30, acting as an auto-transformer, in a high voltage rectifying tube 34 and leading it to the second anode.

The adjustment of circuit elements 24, 25 and 26 are made at the factory or as permanent adjustments at the time of installation. Thus it is seen that, as described up to the present, the alternating current component of the voltage introduced across coils 22 and 23 is fixed. A switch 35, however, is provided which when closed, closes a path through lead 36 directly from potentiometer 24 to horizontal deflection coils 22 and 23, thereby cutting network 25 and 26 out of the circuit and increasing the alternating current component of the voltage across coils 22 and 23, increasing the current through them and in turn increasing the extent of the horizontal movement of the electron beam. This, of course, increases the horizontal dimension of the picture reproduced on the screen.

Similarly a switch 37 is provided to remove, when it is closed, an adjustable resistance 38 from the circuit supplying the alternating current voltage component to the vertical deflection coils 39 and 40. The removal of resistance 38 raises the alternating current component of the voltage across the vertical deflection coils, increases the extent of the vertical motion of the electron beam and thus increases the vertical dimension of the picture reproduced on the screen. Network 25 and 26 and resistance 38 are mutually adjusted in the factory or at the time of installation, so that when switches 35 and 37 are closed the resulting changes in the alternating current components of the voltages across the horizontal deflection coils and vertical deflection coils are so proportioned that the changes caused by closing these switches in the horizontal and vertical dimensions of the picture reproduced on the screen are such that those dimensions are in the same proportion that they were before the changes were made.

Being able initially to adjust the impedance changes in the horizontal deflection coil circuits and in the vertical deflection coil circuits to produce the properly proportioned changes of dimensions of the reproduced picture, it is possible to accomplish these changes simultaneously by ganging switches 35 and 37 together so as to operate them by actuator 15. Ganged also to actuator 15 is switch 41 which modifies the cathode bias of vertical deflection amplifier 42 (shown only partially) by introducing an adjustable amount of resistance 43 in parallel with the biasing resistance 44 of that cathode, thus compensating for any tendency of the deflection system to deviate from a linear saw-tooth wave. As with the other resistances mentioned above, resistance 43 need be adjusted only once at the time of installation.

The adjustments in the voltage supply circuits of the horizontal and vertical deflection units effected by a single switch may be accomplished in parts of those circuits other than those shown in Fig. 4. For instance, the alternating current component of the voltage supply to horizontal deflection coils 22 and 23 and to vertical deflection coils 39 and 40 shown in Fig. 5 is simultaneously varied by ganged controls 35 and 37 which may be switches or continuously variable controls operated by a user-operated actuator 15. Varying controls 35 and 37 changes the grid inputs of the respective horizontal and vertical deflection amplifiers by means of potentiometers 26 and 38 in the grid circuits of those amplifiers.

Another form of the invention is shown in Fig. 6 applied to an electrostatically controlled tube. In this case the alternating current components of the voltages on horizontal deflection plates 22 and 23 and vertical deflection plates 39 and 40 are respectively and proportionately varied by ganged switches 35 and 37 operating potentiometers 26 and 38 in the respective output circuits of the horizontal diflection amplifier and the vertical deflection amplifier. As before, switches 35 and 37 have a common actuator 15 which can be manipulated by the user either at the set or at a distance therefrom.

Figure 7:
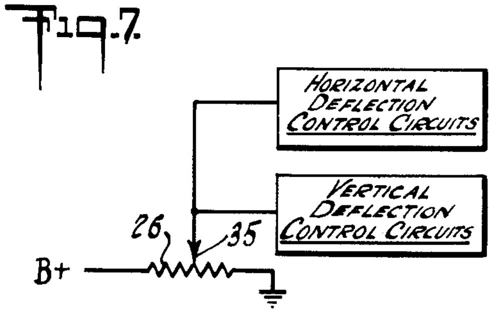
Fig. 7 is a block diagram of a portion of a television receiver embodying a special modification of the present invention.

Fig. 7 shows a special modification of the present invention which is of particular use in receivers employing cathode ray tubes of small diameter where economy of design and construction is desired. In this modification at the expense of the loss of a small degree of linearity the two variable impedance elements, such as network 25 and 26 and resistance 38 of Fig. 4, may be combined in one potentiometer 26 having a variable tap 35 through which voltages are fed to both horizontal and vertical deflection circuits. Variable tap 35 is controlled by the user of the receiver.

It is to be understood that the arrangement shown in Fig. 7 may be used most favorably with cathode ray tubes of relatively small diameter because with larger diameter tubes, unless the impedance switched in and out of the voltage supply circuits of the deflection electrodes is preadjusted as is described in connection with the modifications shown in Figs. 4, 5 and 6, excessive distortion may be introduced. Further, as the size of the cathode ray tube used is increased, it becomes necessary to make compensating adjustments for other things as focus and brightness. The principles of the invention having been explained, it will be obvious to one skilled in the art that additional contacts can be ganged to actuator 15 in a way similar to the way linearity compensating contact 41 is arranged in Fig. 4 to accomplish this purpose.

The illustrative embodiments described hereinabove have been applied to a direct view television receiver, that is, one in which the picture is viewed directly on the screen formed at the end of the cathode ray receiving tube, but it is to be understood that the invention is not so limited and that it can be readily applied to a so-called projection receiver in which the picture is projected through an optical system from the screen in the cathode ray tube to a larger second screen.

In most instances the portion of the picture that the user would desire to enlarge is somewhere near the center of the field of action of the entire picture but in some instances the user might desire to enlarge a portion of the picture relatively near one of the edges of the field of action. In such case the controls and means disclosed, described and claimed in the above referred to co-pending application S. N. 64,668 enable the user to shift the position of the original picture and choose any desired portion thereof to enlarge.

I claim:

1. In a television receiver, a cathode ray tube, a viewing screen on the tube normally adapted to show an image having a rectangular shape in its central portion, means associated with the tube for horizontally deflecting an electron beam, means for supplying a saw-tooth wave to the horizontal deflecting means to provide a linear horizontal sweep, an impedance network connected between the supply means and the deflecting means for controlling the width of the horizontal sweep, a first normally open switch remotely located from the receiver, the switch being electrically connected across the impedance network to provide a by-pass for the network upon the closing of the switch, means associated with the cathode ray tube for vertically deflecting the electron beam, means for supplying a saw-tooth wave to the vertical deflecting means to provide a linear vertical sweep, a resistance connected between the vertical supply means and the vertical deflecting means, and a second normally open switch remotely located from the receiver and ganged to the first switch, the second switch being connected between the vertical supply means and the vertical deflecting means to provide a by-pass for the resistance connected thereto, the impedance in the horizontal and the resistance in the vertical deflecting circuits having predetermined values relative to each other such that the closing of the switches causes the horizontal and vertical sweeps to be magnified by a constant ratio and the central portion of the rectangular image to be enlarged on the complete screen of the cathode ray tube.

2. In a television receiver, a cathode ray tube, a relatively flat face providing a screen at one end of the tube, means for horizontally deflecting an electron beam to provide a horizontal scan across said screen, means for providing the deflecting means with a saw-tooth voltage to deflect said beam, an impedance network, including an adjustable resistance, connected between the voltage supply and said deflecting means, a switch freely movable about the receiver and connected across said impedance network to provide a by-pass for the network when closed, means for vertically deflecting the electron beam to provide a vertical scan across said screen, means for providing the vertical deflecting means with a saw-tooth voltage to deflect said beam, an adjustable resistance, connected between the last-mentioned voltage supply and deflecting means, and a second freely movable switch ganged to the first switch and connected across said resistance to provide a by-pass for said resistance when closed, the impedance of said networks and said adjustable resistance being initially adjusted relative to each other to provide enlargements of the horizontal and vertical scans proportionate to their original dimensions when the switches are closed.

3. In a television receiver, a cathode ray tube, a viewing screen on the tube, means in the tube for deflecting an electron beam through a horizontal sweep, means providing a voltage for so deflecting the beam, an impedance network connecting the supply means and the deflecting means, the impedance network including an adjustable inductance and adjustable resistance in parallel, a switch connected to the supply means and deflection means to provide a by-pass for the impedance network when closed, the switch being remotely located from the receiver, means in the tube for deflecting the electron beam through a vertical sweep, means providing a voltage for so deflecting the beam, an adjustable resistance connected between the voltage supply means and the deflecting means for the vertical sweep, a second switch ganged to the first switch and connected across the adjustable resistance in the vertical sweep circuit to provide a by-pass for said resistance when closed, the adjustable resistance in the vertical sweep circuit and the impedance network in the horizontal sweep circuit being initially adjusted to provide dampings in the horizontal and vertical sweeps such that a rectangular picture is obtained in the central portion of the viewing screen with the switches open and the central portion of the rectangular picture is enlarged to an area greater than that of said viewing screen and of the same ratio of dimensions as that of the unenlarged picture with the switches closed.

4. In a television receiver, a cathode ray tube, a relatively flat face providing a screen at one end of the tube, means for horizontally deflecting an electron beam to provide a horizontal scan across said screen, means for providing a saw-tooth voltage to deflect said beam, an impedance network, including an adjustable resistance, connected between the voltage supply and deflecting means, a switch freely movable about the receiver and connected across said impedance network to provide a by-pass for the network when closed, means for vertically deflecting the electron beam to provide a vertical scan across said screen, means including a vertical deflection amplifier for providing a saw-tooth voltage to deflect said beam, an adjustable resistance, connected between the last-mentioned voltage supply and deflecting means, a second freely movable switch ganged to the first switch and connected across said adjustable resistance to provide a by-pass for said resistance when closed, said impedance network and said adjustable resistance being initially adjusted relative to each other to provide proportionate enlargements of the horizontal and vertical scans when the switches are closed, a second adjustable resistance connected to said vertical deflection amplifier to vary the output of the amplifier, and a third freely movable switch ganged to the first and second switches and connected across said second adjustable resistance to provide a by-pass for said resistance when closed.

BARNET S. TROTT.

REFERENCES CITED

The following references are of record in the file of this patent:

UNITED STATES PATENTS

| Number | Name | Date |
|---|---|---|
| 1,978,684 | McCreary | Oct. 30, 1934 |
| 2,039,119 | Schlesinger | Apr. 28, 1936 |
| 2,098,390 | Iams | Nov. 9, 1937 |
| 2,165,815 | Rhea | July 11, 1939 |
| 2,207,389 | Wendt | July 9, 1940 |
| 2,244,251 | Goldsmith | June 3, 1941 |
| 2,274,098 | Shore | Feb. 24, 1942 |
| 2,304,057 | Schade | Dec. 1, 1942 |
| 2,310,671 | Batchelor | Feb. 9, 1943 |
| 2,368,449 | Cook | June 30, 1945 |
| 2,449,969 | Wright | Sept. 28, 1948 |

FOREIGN PATENTS

| Number | Country | Date |
|---|---|---|
| 456,288 | Great Britain | Nov. 6, 1936 |
| 520,235 | Great Britain | Apr. 18, 1940 |
| 111,632 | Australia | Sept. 25, 1940 |
| 112,758 | Australia | Mar. 18, 1941 |